2,969,273
Patented Jan. 24, 1961

2,969,273

SEPARATION OF CARBON DIOXIDE FROM CARBON DIOXIDE-OLEFIN CONTAINING GAS MIXTURES

Herbert Kölbel and Robert Langheim, Homberg, Lower Rhine, Germany, assignors to Rheinpreussen Aktiengesellschaft für Bergbau und Chemie, Homberg, Lower Rhine, Germany, a corporation of Germany No Drawing. Filed Nov. 17, 1954, Ser. No. 469,557

Claims priority, application Germany Aug. 16, 1951

10 Claims. (Cl. 23—3)

This invention relates to improvements in the separation of carbon dioxide from carbon dioxide-olefin containing gas mixtures, and is a continuation in part of our co-pending application, Serial No. 302,608, and now abandoned.

The removal of carbon dioxide from gas mixtures by scrubbing with water under pressure is known. If these gas mixtures contain hydrocarbons and in particular unsaturated hydrocarbons such as olefins, a considerable portion thereof are scrubbed out with the carbon dioxide. If the scrubbing is effected for the removal of the carbon dioxide in order to recover these hydrocarbons, a considerable loss of the olefins will naturally occur.

One object of this invention is the removal of carbon dioxide from gas mixtures containing olefins without the above mentioned difficulties. This and still further objects will become apparent from the following description:

It has now been found, in accordance with the present invention, that the loss of olefins in the removal of carbon dioxide by scrubbing under pressure may be greatly decreased if a salt solution, and particularly a saturated salt solution, of certain salts is used as the absorption or washing agent in place of water. Suitable salts for the preparation of aqueous salt solutions in accordance with the invention are mono alkali phosphates, mixtures of mono and dialkali phosphates, alkali acetates, and alkali citrates. More particularly, by cause of cheapness, the use of monosodium phosphate, mixtures of mono and disodium phosphate, sodium acetate, and sodium citrate, is preferred.

The salt solutions in accordance with the invention must have a pH of below 8, it being particularly advantageous to effect the scrubbing with neutral or acid salt solutions, inasmuch as it has been found that the solubility of the olefins in the gas mixtures decreases with a decreasing pH of the solution. The adjustment of the pH of the salt solution may be effected by the addition of an acid or a base or by mixing salts of different basicity. A pH range of 3–7 is preferred for the salt solution.

The separating action of the carbon dioxide and olefins also depends upon the pressure at which the washing is carried out, an increase in pressure resulting in an increase in the separating action. The washing or scrubbing should, therefore, be effected at a pressure of more than 5 atmospheres gauge, and preferably at a pressure of more than 15 atmospheres gauge.

On a technical scale, the washing is preferably effected in washing towers or scrubbers of any conventional type.

The following examples are given to further illustrate the invention and not to limit the same:

*Example I*

A gas of the composition (percent in volume):

| | |
|---|---|
| $CO_2$ | 89.7 |
| Olefins | 5.8 |
| $O_2$ | 0.0 |
| CO | 0.2 |
| $H_2$ | 0.2 |
| Saturated hydrocarbons | 1.2 |
| $N_2$ | 2.9 | was shaken in an autoclave with water at room temperature and a pressure of 10 atmospheres gauge. A quantity of gas equal to 7 times the volume of water was absorbed. The absorbed gas which escaped upon the release of pressure from the water had the following composition:

| | Percent |
|---|---|
| $CO_2$ | 97.5 |
| Olefins | 2.1 |
| $N_2$ | 0.4 |

Therefore, a considerable part of the olefins, contained in the initial gas, was also absorbed.

*Example II*

Example I was repeated using the following saturated aqueous salt solutions instead of water as the washing agent. The results obtained (along with the results of a water run) are set forth in the following table:

| Run | Absorption Agent | pH | Gas Pressure in Atms. | Coefficient of Absorption | Composition of absorbed gas which escaped upon pressure release | | |
|---|---|---|---|---|---|---|---|
| | | | | | $CO_2$, percent | Olefins, percent | $N_2$, percent |
| 1 | Water | 7 | 10 | 7 | 97.5 | 2.1 | 0.4 |
| 2 | $Na_3PO_4$ | 14 | 10 | 17 | 97.6 | 2.1 | 0.3 |
| 3 | $Na_2HPO_4$ | 9.5 | 10 | 13 | 98.7 | 1.0 | 0.3 |
| 4 | $NaH_2PO_4$ | 4.5 | 10 | 2.5 | 99.6 | 0.2 | 0.2 |
| 5 | $Na_2HPO_4+NaH_2PO_4$ | 7 | 10 | 10.5 | 99.2 | 0.6 | 0.2 |
| 6 | $Na_2HPO_4+NaH_2PO_4$ | 7 | 20 | 16 | 99.6 | 0.2 | 0.2 |
| 7 | $Na_2HPO_4+NaH_2PO_4$ | 5.8 | 10 | 9.5 | 99.5 | 0.4 | 0.1 |
| 8 | Na-acetate | 6.8 | 10 | 10.5 | 99.6 | 0.2 | 0.2 |

From the table appearing in Example II, the advantageous separating action of the prescribed salt solutions can be seen. Further, the criticality of the pH of the salt solution is quite evident. Thus, whereas in run 1 where water alone is used as the absorption agent and in runs 2 and 3 where the salt used has a pH in excess of 8, the loss in olefin content is relatively high. As compared to this, in runs 4 through 8, where the prescribed salt solutions having the prescribed pH are used, the loss of olefins is extremely small. The table further demonstrates that the solubility of the olefins can be still further reduced by increasing the pressure of absorption as shown in a comparison between runs 5 and 6.

*Example III*

A gas of the same composition as in Example I was washed in a scrubbing tower with a saturated aqueous solution of mono potassium and dipotassium phosphate having a pH of 7, at a temperature of 20° C. and a pressure of 10 atmospheres gauge. Upon releasing the pressure of the scrubbing solution, a gas escaped of the following composition: 99.7% $CO_2$, 0.2% olefins, 0.1% $N_2$ (percent in volume).

*Example IV*

Under the same conditions of temperature and pressure as in Example IV, a gas of the same composition as in Example I was washed with a saturated aqueous solution of sodium citrate having a pH of 6.8. The absorbed gas, escaping from the citrate solution after releasing the pressure, had the following composition (in percent of volume): $CO_2$ 99.5%, olefins 0.2%, $N_2$ 0.3%.

We claim:

1. In the method for the separation of carbon dioxide from carbon dioxide-olefin containing gas mixtures by absorption of the carbon dioxide, the improvement which comprises contacting such a gas mixture under pressure with an aqueous alkali salt solution having a pH of below 8 and selected from the group consisting of aqueous alkali acetates, aqueous alkali citrates, aqueous mono alkali phosphates, and mixtures of aequeous mono and dialkali phosphates.

2. Improvement in accordance with claim 1, in which said salt solution is a saturated salt solution.

3. Improvement in accordance with claim 1, in which said alkali salt is a sodium salt.

4. Improvement in accordance with claim 1, in which said contacting is effected at a pressure of at least 5 atmospheres gauge.

5. Improvement in accordance with claim 4, in which said contacting is effected at a pressure of at least 15 atmospheres gauge.

6. Improvement in accordance with claim 1, in which the pH of said salt solution is between 3 and 7.

7. Improvement in accordance with claim 1, in which said salt solution is a solution of sodium citrate.

8. Improvement in accordance with claim 1, in which said salt solution is a solution of monosodium phosphate.

9. Improvement in accordance with claim 1, in which said salt solution is a solution of a mixture of monosodium phosphate and disodium phosphate.

10. Improvement in accordance with claim 1, in which said salt solution is a solution of sodium acetate.

References Cited in the file of this patent

UNITED STATES PATENTS

| | | |
|---|---|---|
| 491,365 | Luhmann | Feb. 7, 1893 |
| 1,852,763 | Trotter | Apr. 5, 1932 |
| 2,110,403 | Rosenstein | Mar. 8, 1938 |
| 2,182,305 | Rosenstein | Dec. 5, 1939 |

OTHER REFERENCES

Mellor: "Comprehensive Treatise on Inorganic and Theoretical Chemistry," vol. 8, 1928, page 966, Longmans, Green and Co., New York.